United States Patent [19]

Skret

[11] Patent Number: 4,980,913

[45] Date of Patent: Dec. 25, 1990

[54] SECURITY SYSTEM NETWORK

[75] Inventor: Daniel L. Skret, San Jose, Calif.

[73] Assignee: Vindicator Corporation, San Jose, Calif.

[21] Appl. No.: 183,112

[22] Filed: Apr. 19, 1988

[51] Int. Cl.$^5$ ............................................... H04L 9/00
[52] U.S. Cl. ........................................ 380/23; 370/85.1; 370/94.1; 340/825.07; 340/825.08
[58] Field of Search ............... 370/94, 85; 340/825.07, 340/825.08; 380/23

[56] References Cited

U.S. PATENT DOCUMENTS

| | | | |
|---|---|---|---|
| 4,477,800 | 10/1984 | O'Brien | 340/825.08 |
| 4,658,243 | 4/1987 | Kimura et al. | 340/825.08 |
| 4,740,787 | 4/1988 | Kimura | 340/825.08 |
| 4,831,558 | 5/1989 | Shoup et al. | 340/825.08 |

Primary Examiner—Thomas H. Tarcza
Assistant Examiner—David Cain
Attorney, Agent, or Firm—Townsend and Townsend

[57] ABSTRACT

The present invention uniquely applies data communications network techniques to a security system. A series of slave transponders are coupled via a full duplex bus to a master node. The master node is coupled to other master nodes to form a network. The master node periodically polls its slave transponders to authenticate them. Each transponder has processing capability to give a distributed processing system. Each master node is a gateway which directs transmissions to the appropriate end point. The system uses an accordion-like protocol which can have fields added or deleted in a specific structure to conform the protocol to the particular message being transmitted. The protocol begins with address bytes indentifying the destination followed by a control field which identifies the fields which are present. For a broadcast, rather than a point-to-point transmission, a process ID field in the protocol determines what area or function has to be addressed in all units. This area or function can be addressed for a large number of nodes by using this protocol field. The protocol is data transparent, it will handle any type of data. A sequence field allows the protocol to simultaneously handle redundant and non-redundant lines. The protocol allows point-to-point encryption of data and can operate over any media, electrical, optical RF, etc. The routing algorithm includes an authentication byte attached by a particular transponder node and authenticated by a bus master connected to that node. The bus master substitutes its own authentication byte and sends the transmission along to the next point, where the authentication process is repeated. This allows authentication without requiring decrypting and re-encrypting of the transmission at each intermediate point.

17 Claims, 3 Drawing Sheets

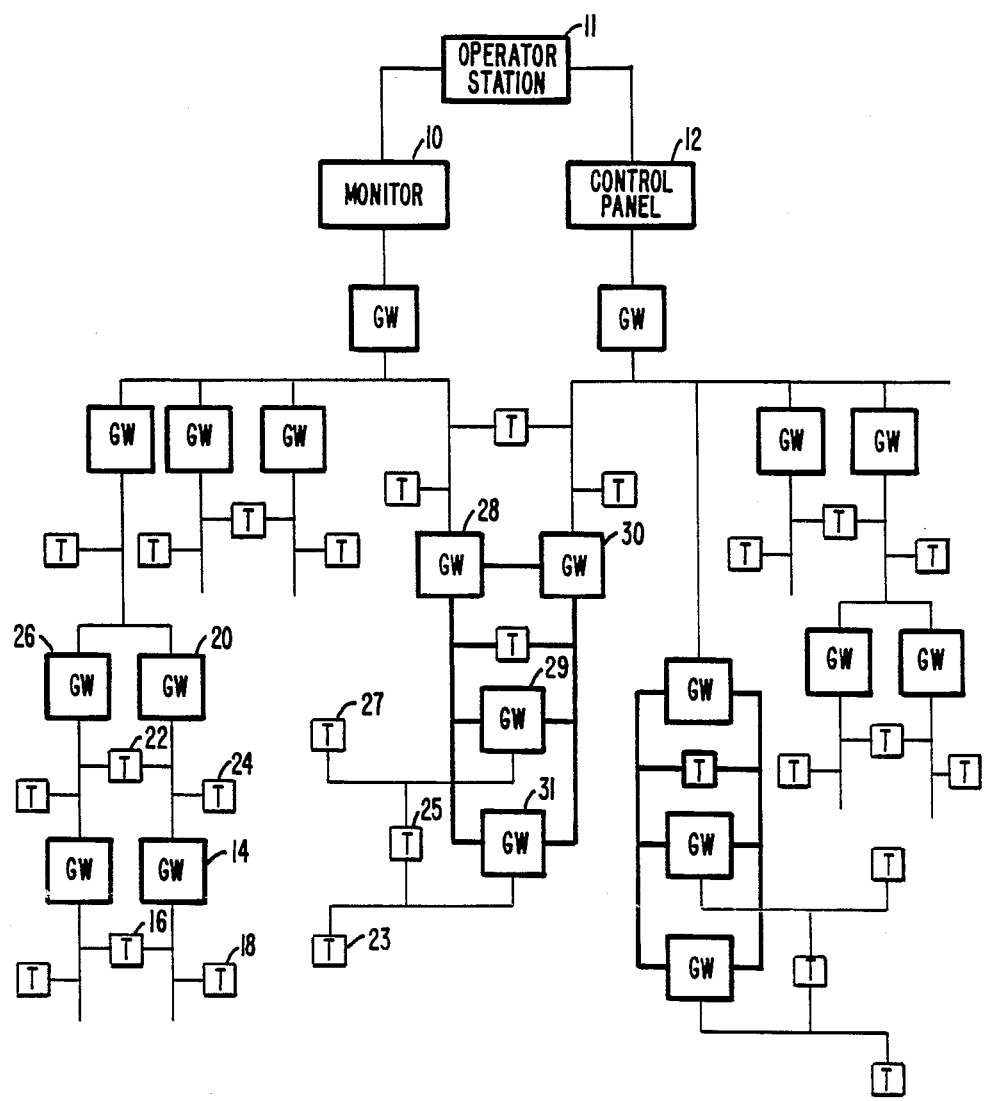
FIG._1.

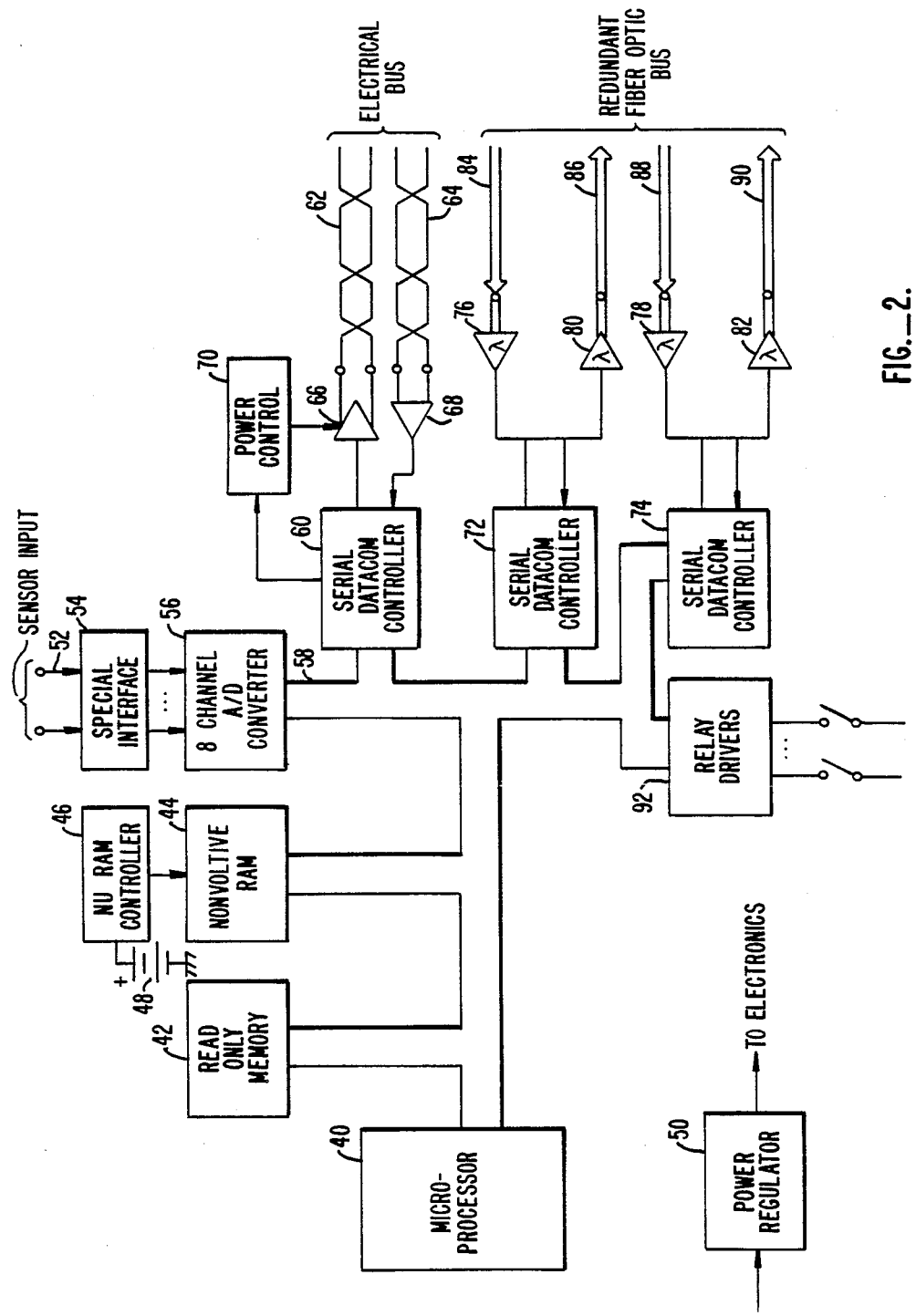
FIG._2.

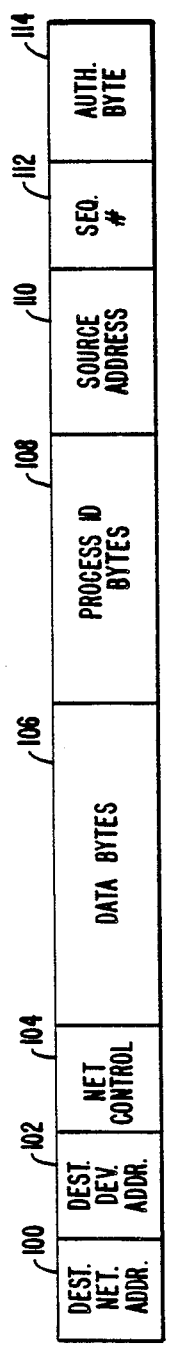
FIG._3A.
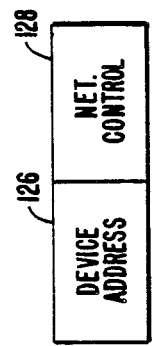
FIG._3C.
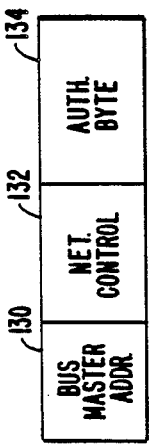
FIG._3D.
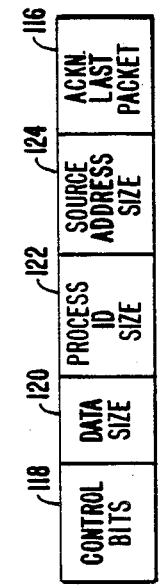
FIG._3B.

SECURITY SYSTEM NETWORK

BACKGROUND

The present invention relates to data communication systems, and in particular to such systems as applied to security networks.

A typical security system will have a number of transponders coupled to sensors which are used for the monitoring and control of intrusion detection. The signals from the transponders are provided to a central control console. Different techniques are applied to prevent unauthorized interception, tampering or jamming. Redundant communications and encryption are used to protect against intentional compromise of transmitted information. Information transmitted is typically a short message from a transponder using a state machine which is routed over a low bandwidth data line. Fiber optic are sometimes used to prevent monitoring, with the fiber optics signal being being converted to an electrical signal at some point for monitoring or control.

In contrast, data transmission systems for computer-to-computer file transmissions are typically designed for a benign environment with wide bandwidth communication channels. An example is shown in U.S. Pat. No. 4,063,220. A large bandwidth allows complicated protocols to be used. In some applications, data encryption is used, such as for transmission of computerized bank records. Such information processing systems are optimized for a large aggregate throughput, whereas security control systems are optimized for low delay of short messages. Current information networks have not been applied to the needs of security systems due in part to their large protocol overhead and the need for a high bandwidth medium.

SUMMARY OF THE INVENTION

The present invention uniquely applies data communications network techniques to a security system. A series of slave transponders are coupled via a full duplex bus to a master node. The master node is coupled to other master nodes to form a network. The master node periodically polls its slave transponders to authenticate them. Each transponder has processing capability to give a distributed processing system. Each master node is a gateway which directs transmissions to the appropriate end point.

The system uses an accordion-like protocol which can have fields added or deleted in a specific structure to conform the protocol to the particular message being transmitted. The protocol begins with address bytes identifying the destination followed by a control field which identifies the fields which are present. For a broadcast, rather than a point-to-point transmission, a process ID field in the protocol determines what area or function has to be addressed in all units. This area or function can be addressed for a large number of nodes by using this protocol field.

The protocol is data transparent, it will handle any type of data. A sequence field allows the protocol to simultaneously handle redundant and non-redundant lines. The protocol allows point-to-point encryption of data and can operate over any media, electrical, optical, RF, etc.

The routing algorithm includes an authentication byte attached by a particular transponder node and authenticated by a bus master connected to that node. The bus master substitutes its own authentication byte and sends the transmission along to the next point, where the authentication process is repeated. This allows authentication without requiring decrypting and re-encrypting of the transmission at each intermediate point.

A unique encryption scheme is used which is directed to a security system application. Because the system uses a large number of similar transmissions, a constantly changing encryption is needed to prevent an intruder from copying the quiescent status signals and substituting a device which can transmit quiescent information. Each node stores separate encryption and decryption keys for every node it may communicate with. Each key is produced by a pseudorandom number generator which produces a new number for each transmission. The generator in a receiving node is synchronized with the generator in a transmitting node since each generator is incremented only for transmissions from the transmitting node to the receiving node. A resynchronizing mechanism is also provided to realign the pseudorandom number generators in the event synchronization is lost due to the loss of power or other reasons.

The network is arranged as a hierarchical tree, with each bus master only storing information about the nodes below it. This organization allows a transmission to only follow the path required to get to its destination, and not to be indiscriminately broadcast. The bus masters poll individual nodes in order to determine if a node desires to transmit. Because there is also a need to test authenticity, these two functions can be combined. The authenticity of the node is tested by a code which is generated in accordance with the encryption scheme described above and transmitted between each node and the bus master. The bus master has a different authentication code for each node. This prevents unauthorized insertion or substitution of a node.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of an example of a security system network according to the present invention;

FIG. 2 is a block diagram of a typical network node (transponder or gateway) board of FIG. 1; and FIGS. 3A-3D are diagrams of the protocol for the packet format according to the present invention.

DETAILED DESCRIPTION OF THE PREFERRED EMBODIMENTS

Network Configuration

The network is a hierarchical system of packet passing nodes. Slave nodes share a full duplex bus that is centrally controlled by one master node. The master node is either the system monitor and control unit (CU) or a gateway computer. A master node controls bus packet traffic by polling each slave node for information.

A network is a collection of slave devices with unique addresses that are connected to a common communications bus. A network can accommodate up to 250 slave devices. Typically, these are transponders. A network's bus may be segmented into sections using differing communications media. Multiple networks can be implemented to allow for more than 250 slave devices to exist in the system. These multiple networks are implemented as separate buses connected in a hierarchical tree fashion. Network protocols allow any slave device to send packets to any other specific slave device across multiple networks. Up to 250 individual networks may exist in a system. This allows many tens of thousands of input and output points to be accommodated.

The network has been designed with several important constraints kept in mind:

(1) The network must guarantee that all packets be successfully delivered because of the nature of the system mission with regard to lives and material.

(2) The network must accommodate encryption of all data, including the information that indicates device readiness to communicate.

(3) The network must support both redundant and nonredundant communications media simultaneously in the same system.

(4) The network protocols must support both full duplex and half-duplex communications media where slave devices may or may not hear each other's responses to requesting devices.

(5) Both broadcast and point-to-point communication with encryption must be possible.

The architecture of the network and the key implementation characteristics are:

(1) a packet network of up to 62,500 nodes, (2) distributed routing through gateway nodes, (3) network of centralized polling computers (gateways) that are responsible for portions of the system, (4) gateways store and forward packets from transponders to the destination device, (5) sequence numbered packets are used to detect duplicate packets generated within the network at redundant bus origins, (6) all packets are sent via an end-to-end protocol with destination to source packet acknowledgment, and (7) packets are held by the source device until explicitly acknowledged by the destination.

The computer-based transponders are used for distributed processing. By moving much of the processing formerly performed by the CU out to the transponders, a more robust, responsive, add flexible system results.

System vulnerability to CU failure is lessened by programming transponders for local control of their relays. This capability allows local annunciation of critical events should the CU be unavailable. Additional capabilities for transponders to communicate with each other and to drive simple operator displays further enhance system fault tolerance.

System throughput is increased by moving much of the CU alarm processing out to the individual transponders. This improves system response time by reducing the amount of detail information sent over the network and through the inherent parallel processing of alarm information by the transponders.

FIG. 1 shows an example of a network system layout according to the present invention. A number of transponder boards (designated T) are interconnected with a number of gateway boards (designated GW) to form a network system. These may be connected, for example, to a central monitor 10 and a central control panel 12. These are shown coupled to a master control station 11, but any other configuration could be used. FIG. 1 is intended to illustrate the various possible connections rather than an actual network. Monitor 10 and control panel 12 could be directly coupled together, rather than in parallel. As shown, one group of nodes is under monitor 10, another group under control panel 12 and a middle group is under both. These groups could be combined to report to a single control panel or monitor, or any other configuration could be used. The system is constructed as a hierarchical tree, with each gateway only storing information about the transponder boards below it. For example, a gateway 14 would store information about transponders 16 and 18. Similarly, a gateway 20 would store information about transponders 22 and 24 and gateway 14. Some redundancy is provided since a gateway 26 will also store information about transponder 22.

Each gateway periodically polls the elements coupled below it to authenticate those elements with a constantly changing authentication code which is specific to each element. In addition, each gateway polls the elements below it to determine if that element desires to transmit. These polling functions are combined. If an element desires to transmit, the polling is stopped for the transmission.

For a transmission from transponder 18, the transmission would be sent to gateway 14 and authenticated. Gateway 14 would then send the transmission on to gateway 20 when it is polled by gateway 20. If the transmission is intended for transponder 24, gateway 20 will then send the transmission down to transponder 24 after authenticating that it originated from gateway 14. If the destination is for other than transponders 22 and 24, gateway 20 will send the transmission on up the hierarchical tree.

In addition to the bridging type gateways shown and described, other gateway circuits may be used for medium conversion or signal regeneration. In this event, the gateway is given a slave address just as any other device in the network, with the address being the same on both sides of the gateway.

A dual redundant fiber optic path is shown between gateways 28 and 30. In such a system, each of the gateways acts as bus master and alternately polls the system and then the two gateways check with each other. Gateways 29 and 31 appear like transponders to gateways 28 and 30 and act as fiber optic to twisted pair (electrical) converters for transponders 23, 25 and 27.

FIG. 2 is a block diagram of a typical network node. The network node could be configured as either a transponder on a gateway depending upon the type of microprocessor used, the programming and the connections made. The node uses a microprocessor 40 which stores its program in a read only memory (ROM) 42. A random access memory (RAM) 44 is used by the microprocessor for storing data. A nonvolatile RAM controller 46 coupled to a battery 48 keeps the RAM powered and refreshed to preserve its data in the event of a power down of the node. The power for the node is provided through a power regulator 50.

The node has a number of sensor inputs 52 which are provided through a special interface 54 to an eight channel analog to digital (A/D) converter 56. The special interface can be, for example, an analog voltage measuring interface, a DC supervised current loop or a supervised power output for a 2-wire smoke detector. The output is provided to an internal bus 58. The sensor inputs can thus take an analog sensor signal and provide it in digital form on bus 58 to microprocessor 40.

A serial data communications controller 60 is coupled to two electrical buses 62 and 64 via a differential bus driver 66 and a differential receiver 68. Buses 62 and 64 are twisted pair wire. Alternately, an RS232 port could be used. A power control circuit 70 is used to shut off bus driver 66 when no transmissions are occurring in order to conserve energy since bus driver 66 consumes a significant amount of current. Some gateways, such as gateway 14 of FIG. 1, have a second electrical data-communication controller for coupling to another pair of two electrical buses.

The network is configured so that each transponder board has its output coupled to the input of the gateway (bus master board and the gateway has its output coupled to the inputs of the transponder boards.

A pair of redundant fiber optic buses are coupled to serial data communication controllers 72 and 74 via intermediate optical to electrical converters 76 and 78 and electrical to optical converters 80 and 82. The redundant combination provides a first optical loop with optical fiber buses 84 and 86 and a second optical loop with optical buses 88 and 90. Effectively, converters 76 and 80 pick off a piece of the bus loop formed by fiber optic cables 84 and 86 and allow that piece, in electrical form, to be accessed by the node. The microprocessor will listen for communications which are received through one of controllers 72 and 74, and will transmit a response on the other one of the controllers. Thus, one fiber optic link will be used for receiving transmissions and the other fiber optic link for transmitting.

FIG. 2 also shows relay drivers 92 which can be used to activate locks for access control, etc.

In addition to the sensor inputs 52, the serial input on lines 62 and 64 could be used for serial data from a sensor instead of an analog sensor input A gateway board has the same elements and can simultaneously act as a gateway and a transponder. Thus, a gateway can monitor its own enclosure without requiring a separate transponder board. In its transponder status, the gateway will be polled by the next gateway up the hierarchical tree.

Because of the small message size and the rate of repetition of the same messages, a standard encryption scheme used for computer networks won't be adequate for a security system. A constantly changing encryption is needed. In the present invention, upon installation, a key is given to each node. This key is a starting point, N, for a pseudorandom number generator which is implemented in the software program for microprocessor 40 stored in ROM 42. The pseudorandom number generator generates a pseudorandom stream of numbers up to the starting point, N (which may be 0). For a first transmission by a node, this starting point, N, is used to give a pseudorandom number to encrypt the first character. The N+1 pseudorandom number is used for the second character, the N+2 pseudorandom number for the third character, etc. The receiving node, realizing that this is the first reception from the transmitting node, also starts at N, and increments for each character received. If a 31 character transmission is received, the receiver knows that for the next transmission from that same node, it should start at 32. A separate sequence counter is used for each node communicated with. One sequence counter is used for transmissions from that node, while another sequence counter is used for transmissions to that node. Accordingly, two sequence counters are used for each node communicated with. This allows two devices to simultaneously initiate communication with each other. These sequence counts are stored in RAM 44.

The same pseudorandom number generator is used for all nodes communicated with, with separate sequence counters being used for each node communicated with.

In the event that a node is unable to decode because it is out of sequence, the receiving node determines it is out of sequence and sends a nonencrypted message to the transmitting node indicating that it is out of synchronization and requesting resynchronization. Such resynchronization is typically needed after a power down and subsequent power up by a particular node. Thus, the request for resynchronization must be sent in clear text since the receiver's encrypted transmitter, which is separate, will most likely be out of synchronization as well from a power down.

When such a request for resynchronization is received, the current pseudorandom number (key) is encrypted using the starting pseudorandom number (key) and transmitted to the node which is out of synchronization. Thereafter, the pseudorandom number sequence picks up where it left off. The key used for resynchronization can be varied periodically by transmitting between the two nodes a new resynchronization key which may vary from the starting key.

In addition to the point-to-point encryption scheme, each bus master has a separate encryption scheme for a broadcast to all of it's slave nodes.

FIGS. 3A–3D show the packet format according to the protocol of the present invention. FIG. 3A shows one example of the total number of possible fields or bytes. Depending upon the type of transmission, different combinations of the bytes may be used. A minimum packet size is shown in FIG. 3C for a bus master poll. There, only two bytes are used.

Returning to FIG. 3A, the first byte 100 is an optional destination network address. This is followed by a destination device address 102 which must always be present. Immediately after the addresses, is a network control byte 104 which specifies which bytes are present in the packet. This byte(s) indicates the presence of certain optional fields. This control byte is necessary for nodes to accurately determine the length of the packet.

Data bytes 106 follow the control field. The process ID field(s) 108 which are optional, follow. These fields are used to identify a process or area of the node or nodes addressed. A process or area in all nodes can be addressed by doing a broadcast which uses the process ID fields for identifying the process or area addressed. Such a broadcast can be to one network or to the whole system. Data field 106 and process ID field 108 are both encrypted for decryption by the destination. This is followed by an optional source address field 110.

A sequence number field 112 allows the destination node to determine if the packet is a duplicate of one already received. Duplicate packets may be received where redundant bus segments are used.

An authentication byte 114 rounds out the packet. Authentication byte 114 is encrypted and provided from a node to its bus master to indicate that the packet has been transmitted from an authenticated node. The bus master will substitute its own authentication byte in field 114 when it retransmits to the destination node or the next gateway. As shown in the expansion of field 104 in FIG. 3B, the network control field ends with a bit 116 which indicates to the destination device that the last packet sent to the source address has been received.

Transmissions can be sent to other nodes while waiting for an acknowledgment, or additional transmissions can be sent to the same node while keeping track of the multiple outstanding transmissions requiring authentication. A sequence number field can be used to identify the multiple outstanding packets. If no acknowledgment is received, a retransmission can be done.

Control bits 118 indicate a control function or could indicate the presence of an additional extended network control byte. This is followed by a data length field 120 indicating the presence and length of the data bytes. This is followed by a field 122 indicating the process ID size or presence and a field 124 indicating the source address presence and size.

The control bits or byte could signal a resynchronization request, an error message, etc.

FIG. 3C shows a bus master polling packet which includes a device address 126 and a network control byte 128 having all zeros.

FIG. 3D shows a null reply from a slave responding to a bus master poll where the slave does not desire to do a transmission. This packet contains the bus master address in a field 130, a control byte 132 with all zeros, and the authentication byte 134.

Process Identifier

The logical process identifier (process ID field) is most useful in triggering multiple actions throughout the system on the occurrence of an event. The process identifier itself can be a high level unit of system status. For example, a particular process identifier may mean the breach of a high security area, or possibly indicate an area being placed into the access condition. System status information such as this is precisely what encryption is supposed to protect, therefore process identifiers must be encrypted. Encryption presents a problem in the case of broadcast packets, i.e. packets directed to logical processes. The method outlined here allows any device to initiate a broadcast packet to all devices even though the source device has only an encryption seed for its bus master.

(1) The source device, transponder A, sends a broadcast packet indirectly to its bus master, gateway GA.
(2) Gateway, GA, sends the broadcast packet to its bus slaves using a common bus encryption sequence. This broadcast packet is:
 (a) received by all bus slaves;
 (b) rejected by the source device (transponder A), and
 (c) not passed on by any slave gateways.
(3) Gateway, GA, individually sends the broadcast packet via indirect means to each of its slave gateways.
(4) Gateway, GA, sends the broadcast packet up to its bus master, GM, via the indirect method. GM retransmits the broadcast packet to its slaves using its bus common encryption sequence Gateway, GA, like all gateways, will not pass on a direct broadcast packet. This protects GA's slaves and gateways from receiving duplicate packets.

This method allows packets to flow over the system to the extent that the broadcast addressing criteria is met. Bus sections that have no devices meeting the addressing criteria are spared from handling the broadcast packet. The broadcast packet travels upward toward the system master and downward to remote slaves simultaneously. All devices that have received and been able to utilize the broadcast packet (i.e. has a corresponding process (identifier) will acknowledge the original source device).

Using Process Identifiers

Process identifiers are used to target a specific routine or application program within a device. A process identifier can also be a unit of data. The receipt of a process identifier is in itself an event with informational significance. It is possible to signal an alarm condition with the transmission of a single packet containing only a process identifier. Alternatively, a process identifier may indicate a general condition such as alarm, and additional information in the data area is needed to identify the specific zone that is in alarm.

Process identifiers can be thought of as subroutine labels and are used to transfer control of a distributed program from one device to another. Data is very often passed to and returned from subroutines, and application processes are no different in this respect. A decision must be made when designing a new process that both accepts data when invoked, and returns data when it completes, as to whether to send the return data to the same process identifier located in the "calling" device. The recommended convention is that return data h=sent to a different process identifier then the one invoked. This is because various network error conditions might return the error code to the originating device by referencing the process identifier sent to the destination device. For this reason, all co-processes should carry different process identifiers.

Redundancy

Systems having dual independent system masters require that the transponders send alarm event packets out on both buses so as to alert both system masters of the event. This is in contrast with a single system master where either bus may be used to send a single packet of alarm information. If the two system masters are given different device addresses, then the transponder will send two packets in a standard case of point-to-point communication. The only difference is that the master device address is communications port specific. This is easily accommodated in the transponder configuration programming.

The redundant electrical bus using two twisted-pair cables per bus requires the use of three gateways. Because gateways configured for electrical bus medium are only dual ported, two gateways must be used to isolate the redundant buses from each other. These gateways in turn are connected eventually to a common bus master. The two redundant bus gateways are on the same level in the network hierarchy and therefore unaware that they poll transponders in common. Packets arriving at these gateways bound for their bus slaves are passed on by both bus masters. Since these gateways have essentially created a duplicate or redundant packet, the destination device will receive the packet regardless of a single bus failure. One of the packets will be discarded as a duplicate when both buses are functional. Transponder produced packets will only need to be sent on one of the redundant buses.

The fiber optic bus provides redundancy of communications paths but does not allow both paths to be used simultaneously. This means the bus master must coordinate bus polling. Packets arriving at the gateway can be sent over one of the fiber paths at the discretion of the bus master. Duplicate packets are not created here as they were in the electrical configuration above.

The configuration of dual fiber optic bus masters occurs when redundant electrical buses are converted to fiber optic medium, or when two independent system masters drive each side of the fiber optic bus. In either case, the gateways pass packets addresses for their slave devices. Since each gateway can only drive one of the buses, the packet is not further duplicated Special considerations apply when independent system masters send packets to fiber transponders that have one bus in communications failure.

A special case occurs when the dual fiber optic bus is converted to either a single or dual electrical bus. A possibility exists for the packet to be duplicated four times. A hosted fiber optic bus converted to redundant wire via two gateways will generate a packet for each of the redundant electrical buses. A fiber optic bus hosted by two gateways will have redundant packets on the fiber which will be duplicated yet again by the slave gateways. The electrical bus will see four identical packets, two on each bus. The sequence numbering of the plackets allows the transponders to take this in stride. The simplification of the gateway software is offset by the excess bus bandwidth that is utilized by four times redundancy.

There are system configurations where dual bus transponders have no or only partial redundancy. An example is systems where there is no single node that connects the buses together. In this case, transponder event packets must flow to two "system masters". Since two system masters exist, they have differing encryption sequences and therefore must have unique addresses. This is an example of device-to-device communications where an event causes two packets to be sent to different devices over different communications ports. The bus alternatives for the transmission of a data packet are as follows:

(a) packets to device must travel over specific bus; and (b) packets to a device may travel over either bus.

This means that the port number (1..n, any) is a local extension of the network/device address of the destination node. A dual port transponder may have a mix of destination nodes some of which are available over either redundant port, and some of which are port specific. In addition, packet generating algorithms must be able to cause multiple packets to be sent to different devices on different ports.

Packet Routing

Packet routing is accomplished in a distributed fashion across the system. A inter-network packet originating from a slave node consists of the dual byte network/device address. This packet is passed to the originating device's gateway where the network address is matched against an internal list of networks that are connected below the gateway. If the destination network address is found in this list, then the packet is re-transmitted by the gateway over its network. The next bridging gateway below the source slave's bridging gateway will match the network address to its internal list of served networks, and if found, pass the packet downward. This continues until the final destination network gateway is found where the network address is stripped and the short form address is used. If a response is required, the source node may include a return address in its data field. Of course, the process at the destination node may implicitly know the return address. This depends on the nature of the process.

If the destination network is not found to be under the gateway of the source node, then the packet is propagated up from the gateway to the host gateway. The host gateway might be another simple gateway, a bridging gateway, or even a control unit. In either case, the host node examines its network tables for the destination network address, and carries out the same operation as was just described above. In this way, destination network addresses move up in the system network hierarchy until either the destination network address is found, or the system host is found.

Encryption Seeds

Encrypted packets may be passed between any two devices in the system provided that the devices have agreed upon seeds (keys) for interchange. Each device must have seeds for communication with its bus master device. These seeds are hand programmed by the user when configuring the system. Once the bus master to device communication paths are encrypted, it is, possible for device-to-device encryption to be implemented. Seeds for communicating with other devices need not be programmed by hand, but can be passed over the network through trusted gateways.

The method for passing device seeds is as follows:

(1) device sends an indirect packet (via its bus master) that contains a set of seeds for the destination node;

(2) the bus master decrypts the packet, and determines if the destination device is one of its slave devices. If it is one of its slave, then it encrypts the packet for transmission to the slave. If the destination device is not a slave device to the bus master, then the bus master encrypts the packet for transmission to its bus master and so on, until the bus master is found that hosts the destination device;

(3) the destination device's bus master encrypts and transmits the packet to destination device which decrypts packet and installs source device's seed; and (4) the destination device can now communicate directly to the original device thereby completing the process.

This process connects two different devices together with end-to-end encryption without manual operator intervention. Occasional packets to a device may not need the establishment of end-to-end encryption keys. The same method used for the transmission of keys can be used to send occasional packets from one system device to another.

Some facilities may object to seed exchange without operator intervention. The above algorithms may be disabled requiring the programming of the seeds at the device via the hand held programmer. Another method allows the passing of seed information only via the control unit (CU) where an operator of suitable rank can give permission for such a change. The encryption/decryption is then limited to the devices to the CU, and not each intervening gateway.

Transponders must be programmed with encryption keys for every device with which they will directly communicate. At a minimum, keys must be programmed for the gateway directly polling the transponder and usually the control unit. There is a key used for each direction of communication. These keys must be programmed into both the transponder and the companion device with which it communicates. An additional key is required for broadcast packet reception. A list of typical keys follows:

(1) Transmit key for encrypting data to the nearest gateway.

(2) Receive key for decrypting data from the nearest gateway.

(3) Transmit key for encrypting data to the control unit.

(4) Receive key for decrypting data from the control unit.

(5) Receive key for decrypting global packet data transmitted by the network bridge.

Additional keys are required if a transponder is to communicate with other transponders directly. This requirement would become apparent in the programming of the transponder. If the transponder were instructed to communicate with another device for which it did not have keys, the transponder could establish communication with the target device either autonomously or via the control unit/operator.

Flow Control

Flow control is necessary to accommodate varying medium speeds and finite sized packet buffers. Any system with intervening gateways that poll devices asynchronously are subject to overflow problems Consider the case of a gateway that polls its (250) slave transponders. All the transponders have alarm packets to send to the system master. The gateway must buffer some or all of these packets until it is given the chance to pass them on to its bus master. If the bus on which the gateway is a slave has 250 devices, this time may be as long or longer than it took for the gateway to accumulate the packets from its transponders. Generally, a bus slave is to send a single packet in response to a poll. Gateways may have many accumulated packets, and to send only one packet per round of polling increases the packet latency by the poll time of the gateway's bus master times the number of outstanding packets. For a worst case, a gateway waiting to send 250 packets that is polled once every two seconds, will take 500 seconds or 8.3 minutes to send all packets. If however, a gateway is allowed to send multiple packets during a single poll, then this time can be reduced. Another way is to poll the slave gateways more often than once per poll. As packets move up the network toward the system master, the degree of packet density or concentration increases. The likelihood of gateway buffer overflow increases. To accommodate this fact, the network protocol has several flow control processes that can be invoked to recover, and to facilitate the flow of packets.

One of the easiest flow control measures is to discard packets that cannot be buffered. This is not without a penalty, for the attempt to retransmit could aggravate the problem, and bus bandwidth used in the progress of a packet is lost. A better method is to signal the source that no more packets may be accepted. This occurs when the gateway has used a predetermined number of input buffers. This congestion condition can backup through the network to where it finally reaches the source device. This is an easy algorithm to implement.

The start of a packet is delimited by the destination address byte(s) of the packet. This information is encoded in such a way as to differentiate these bytes from all following information in the packet. The destination address also is read by all intervening nodes to determine the routing to and eventual capture by the destination.

Sequence numbers are unique for each direction between any two nodes in the system. Both the source and destination devices maintain a record of the last used sequence number. The destination device checks incoming packets to be sure that the sequence number is later than previously received packets. The source node assigns sequence numbers in an original way to each subsequent packet sent. A sequence window determines whether a packet received is a copy of one of those previously sent, but allows the finite sequence number to be "reused".

The authentication byte is not properly a part of a network packet, but is a suffix that indicates to the immediate bus master that the device polled or the packet is indeed the device sending the packet. It is the next byte of the pseudorandom encryption generator associated with the bus master/slave device pair. If this byte is not equal to the corresponding value generated by the bus master, the bus master requests that the packet be re-transmitted. If subsequent retransmission is still incorrect, the bus master attempts to resynchronise the slave device with its generator. If the resynchronization is unsuccessful, the bus master declares a possible device tamper.

Gateway Functions

Gateways provide key functions facilitating initialization, fault recovery, broadcast addressing, packet routing and device supervision. The network information that the gateway must store is:

(1) the address of all devices directly polled by the gateway, (2) the encryption sequence of each of these direct slave devices, (3) a slave bus master encryption sequence for encrypting broadcast packets to the slaves, (4) all addresses of networks and devices connected to slave gateways. This information is necessary for the selective routing of packets, (5) an encryption sequence to the bus master above the gateway, (6) an encryption sequence for receiving broadcast packet from the gateway's bus master if the gateway provides transponder functions.

A gateway initializes by polling for all possible slave devices, i.e. 1–250. As each slave device answers, the gateway determines if they are a transponder, or another gateway. If the slave device is a gateway, it is queried as to its device population; it reports both direct and indirect slaves. Once all slave gateways have reported their populations, the gateway is ready to report to its bus master.

Device address

The device address is programmed into the transponder when so enabled by a "programming key" plugged into the eight analog inputs. When a specific set of values are read from the analog inputs, the modification of the device address is possible.

Analog Limit Alarm Processing

Most security sensor inputs are D.C. current supervised loops. The analog monitoring capability of the transponder can be useful in providing three and five state security inputs. By providing a means of defining multiple, overlapping, and prioritized analog windows, sophisticated multistate alarm annunciation can be accomplished over one pair of wires. A typical example is a three state input where the secure window is surrounded by an alarm window which, in turn, is bracketed by a trouble window A more sophisticated type of input is the 5-state supervised input. This input monitors two contacts using three resistors a normally open alarm contact, and a normally closed tamper contact. A tamper verses alarm condition can be determined, and when they occur together, the alarm condition prevails. In addition, the trouble conditions of shorted and open loop can be independently determined.

Window Filtering and Event Counting

The analog inputs are sampled at a constant periodic rate. Provision for timing how long an input value is within a window is useful for filtering out transient noise induced in the sensor loop. Time integration can be accomplished by counting the number of successive samples falling within a window and comparing it to a programmed number of samples. Window status can then be made subject to this filtering.

Event counting is useful in certain types of sensors. This can be accomplished by a second level of integration wherein the number of transitions into a window are counted prior to declaring a status condition.

As will be understood by those familiar with the art, the present invention may be embodied in other specific forms without departing from the spirit or essential characteristics thereof. For example, the encryption scheme set forth could use a single sequence counter for both transmissions to and receptions from a particular node, rather than a transmitting and a receiving sequence counter. In addition, the sequence counter for each node in the encryption scheme could be incremented by both encrypted and clear text bytes or by only encrypted bytes or any other combination. Accordingly, a disclosure of the preferred embodiments of the invention is intended to be illustrative, but not limiting, of the scope of the invention which is set forth in the following claims

What is claimed is:

1. A security network having a plurality of nodes for monitoring a plurality of sensors, comprising:
   a plurality of transponder nodes, each transponder node including
      means for receiving signals from a plurality of said sensors,
      programmable processing means for producing a data transmission responsive to said sensor signals and program instructions,
      means for receiving from and transmitting said data transmissions to other nodes;
   a plurality of gateway nodes, each gateway node including
      means for receiving from and transmitting to a plurality of said transponder nodes and other gateway nodes,
      processing means for analyzing an address portion of said data transmissions and routing said data transmissions to an appropriate recipient.

2. The network of claim 1 wherein distributed processing is used such that a plurality of said gateways include means for analyzing a sensor alarm condition from one of said transponders and generating an appropriate response.

3. The network of claim 1 wherein each said data transmission comprises a packet having types and numbers of fields according to a predetermined protocol which may vary from transmission to transmission, including at least a destination address field and a control field setting forth the types and number of fields present.

4. The network of claim 3 wherein said address field contains flag bits identifying it as an address.

5. The network of claim 3 wherein said field types include a data field and a process identification field, said process identification field selecting a process in each node to which said transmission is directed.

6. The network of claim 5 further comprising means for encrypting said data field and said process identification field at a source node and means for decrypting at a destination node.

7. The network of claim 3 wherein said destination address is a first field in said packet and said control field is the next field in said packet.

8. The network of claim 3 wherein one of the said fields is a sequence number field to identify each packet of a plurality of redundant packets.

9. The network of claim 3 wherein a last field of said packet is an authentication byte for identifying the sender of said packet to the receiver of said packet.

10. The network of claim 1 wherein each said data transmission comprises a packet including an authentication field, each said node including means for verifying that the contents of said authentication field were generated by a neighboring node, each node intermediate other nodes including means for substituting a new authentication code into said authentication field.

11. The network of claim 1 wherein a plurality of said nodes include:
   a first fiber optic port;
   a fiber optic to electrical converter having an input coupled to said first fiber optic port;
   a second fiber optic port;
   a first electrical to fiber optic converter having an output coupled to said second fiber optic port and an input coupled to an output of said first fiber optic to electrical converter;
   a first transceiver coupled to an output of said first fiber optic to electrical converter and an input of said first electrical to fiber optic converter;
   a third fiber optic port;
   a second fiber optic to electrical converter having an input coupled to said third fiber optic port;
   a fourth fiber optic port;
   a second electrical to fiber optic converter having an output coupled to said fourth fiber optic port and an input coupled to an output of said second fiber optic to electrical converter;
   a second transceiver coupled to an output of said second fiber optic to electrical converter and an input of said second electrical to fiber optic converter; and
   means for receiving transmissions from one of said first and second transceivers and directing responses to the other of said first and second transceivers.

12. The network of claim 1 wherein a plurality of said gateway nodes are each coupled via a first port to a plurality of said transponder nodes, said gateway including means for polling said transponder nodes to receive transmissions, and said plurality of gateway nodes each having a second port coupled to another gateway or a controller for providing transmissions in response to polling by said another gateway or controller.

13. The network of claim 1 wherein each node includes a driver coupled to an electrical bus output and means for powering down said driver in the absence of transmissions via said driver.

14. A security network having a plurality of nodes for monitoring a plurality of sensors, comprising:
   a plurality of transponder nodes, each transponder node including
      means for receiving signals from a plurality of said sensors,
      programmable processing means for producing a data transmission responsive to said sensor signals and program instructions,
      means for receiving from and transmitting said data transmissions to other nodes;
   a plurality of gateway nodes, each gateway node including
      means for receiving from and transmitting to a plurality of said transponders and other gateways,
      processing means for analyzing an address portion of said data transmissions and routing said data transmissions to an appropriate recipient;
      each said data transmission being a packet having types and numbers of fields according to a predetermined protocol which may vary from transmission to transmission, including at least a destination address field and a control field setting forth the types and number of fields present, said destination address being a first field in said packet and said control field being a next field in said packet, a last field of said packet being an authentication byte for identifying a sender of said packet to a receiver of said packet.

15. A security network having a plurality of nodes for monitoring a plurality of sensors, comprising:
   a plurality of transponder nodes, each transponder node including
      means for receiving signals from a plurality of said sensors,
      programmable processing means for producing a data transmission responsive to said sensor signals and program instructions,
      means for receiving from and transmitting said data transmissions to other nodes;
   a plurality of gateway nodes, each gateway node including
      means for receiving from and transmitting to a plurality of said transponders and other gateways,
      processing means for analyzing an address portion of said data transmissions and routing said data transmissions to an appropriate recipient;
      each said data transmission being a packet having types and numbers of fields according to a predetermined protocol which may vary from transmission to transmission, including at least a destination address field and a control field setting forth the types and number of fields present, said field types including a data field and a process identification field, said process identification field selecting a process in each node to which said transmission is directed;
      each node including means for encrypting said data field and said process identification field and means for decrypting;
   wherein distributed processing is used such that a plurality of said gateways include means for analyzing a sensor alarm condition from one of said transponders and generating an appropriate response;
   a plurality of said gateway nodes being each coupled via a first port to a plurality of said transponder nodes, said gateway including means for polling said transponder nodes to receive transmissions, and said plurality of gateway nodes each having a second port coupled to another gateway or a controller for providing transmission in response to polling by said another gateway or controller.

16. A method for authenticating a data transmission received in the network of claim 1 comprising the steps of:
   attaching a first authentication code to a data transmission at a source of said data transmission, unique to said source and a first point in a data transmission path;
   verifying said first authentication code at said first point;
   replacing said first authentication code with a second authentication code unique to said first point and a next point in said data transmission path; and
   verifying and replacing each authentication code at each subsequent point in said data transmission path until said data transmission reaches its destination.

17. A method for encrypting at least a portion of data transmissions between nodes in the security system of claim 1 comprising the steps of:
   (a) generating an identical sequence of pseudorandom numbers at both a transmitting and a receiving node;
   (b) providing a key identifying a starting position in said sequence to both said transmitting and receiving nodes;
   (c) incrementing a sequence counter at both said transmitting and said receiving nodes for each predetermined portion of data transmissions between said nodes;
   (d) encrypting segments of said data transmissions using said pseudorandom numbers using said starting position for a first segment corresponding to said first position and using subsequent numbers for succeeding segments corresponding to succeeding portions;
   (e) repeating steps (a)–(d) for each pair of nodes such that each node uses a different sequence counter for each node it communicates with.

* * * * *